(12) United States Patent
Jundt et al.

(10) Patent No.: US 10,324,434 B2
(45) Date of Patent: Jun. 18, 2019

(54) METHOD AND SYSTEM FOR COMMISSIONING PROCESS CONTROL HARDWARE

(71) Applicant: FISHER-ROSEMOUNT SYSTEMS, INC., Round Rock, TX (US)

(72) Inventors: Larry O. Jundt, Round Rock, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 247 days.

(21) Appl. No.: 15/291,200

(22) Filed: Oct. 12, 2016

(65) Prior Publication Data

US 2018/0101152 A1 Apr. 12, 2018

(51) Int. Cl.
  *G05B 19/04* (2006.01)
  *G05B 19/042* (2006.01)
  *G06F 13/40* (2006.01)

(52) U.S. Cl.
  CPC ....... *G05B 19/041* (2013.01); *G05B 19/0425* (2013.01); *G06F 13/4068* (2013.01); *G05B 2219/14102* (2013.01); *G05B 2219/2609* (2013.01); *Y02P 90/18* (2015.11); *Y02P 90/20* (2015.11)

(58) Field of Classification Search
  CPC .............. G05B 19/041; G05B 19/0425; G05B 2219/14102; G05B 2219/2609; G06F 13/4068
See application file for complete search history.

(56) References Cited

U.S. PATENT DOCUMENTS

| 6,098,116 A | 8/2000 | Nixon et al. |
| 6,975,966 B2 | 12/2005 | Scott et al. |
| 7,237,109 B2 | 6/2007 | Scott et al. |
| 7,330,768 B2 | 2/2008 | Scott et al. |

(Continued)

OTHER PUBLICATIONS

U.S. Appl. No. 15/313,030, filed Nov. 21, 2016.

(Continued)

*Primary Examiner* — Kenneth M Lo
*Assistant Examiner* — Michael J Huntley
(74) *Attorney, Agent, or Firm* — Marshall, Gerstein & Borun LLP

(57) ABSTRACT

Techniques for commissioning a process control device in a process plant include obtaining, at a portable computing device, commissioning data for commissioning the respective process control device for operation, such as a device tag. The portable computing device then transfers the commissioning data to a component in the same process control loop as the process control device via a wireless communication link. For example, the component includes a radio-frequency identification (RFID) or near field communication (NFC) unit for receiving RFID/NFC signals. When the portable computing device is within RFID/NFC communication range of the component, the commissioning data is transferred via an RFID/NFC signal to the component. The commissioning data is received while the component is in an unpowered state, where the RFID/NFC signal energizes the RFID/NFC unit at the component for receiving the signal.

19 Claims, 5 Drawing Sheets

(56) References Cited

U.S. PATENT DOCUMENTS

| | | | |
|---|---|---|---|
| 7,668,608 B2 | 2/2010 | Nixon et al. | |
| 2004/0259533 A1* | 12/2004 | Nixon | H04W 76/14 455/414.1 |
| 2004/0260408 A1* | 12/2004 | Scott | G05B 23/0213 700/20 |
| 2006/0200256 A1* | 9/2006 | Mason | G05B 19/054 700/65 |
| 2007/0250180 A1* | 10/2007 | Bump | G05B 19/41845 700/1 |
| 2010/0149997 A1* | 6/2010 | Law | G05B 19/4185 370/248 |
| 2011/0313547 A1 | 12/2011 | Hernandez et al. | |
| 2014/0245451 A1* | 8/2014 | Le Sant | H04L 63/1433 726/25 |
| 2014/0282257 A1* | 9/2014 | Nixon | G05B 11/01 715/835 |
| 2014/0364963 A1* | 12/2014 | Lovell | G06K 19/07758 700/2 |
| 2015/0234381 A1* | 8/2015 | Ratilla | G05B 19/0426 702/104 |
| 2016/0216706 A1 | 7/2016 | Christensen et al. | |
| 2016/0294692 A1* | 10/2016 | Balasubramanian | H04L 45/74 |
| 2017/0228331 A1* | 8/2017 | Rudin | G06F 13/362 |

OTHER PUBLICATIONS

U.S. Appl. No. 15/313,212, filed Nov. 22, 2016.
U.S. Appl. No. 15/313,304, filed Nov. 22, 2016.
U.S. Appl. No. 15/313,372, filed Nov. 22, 2016.
U.S. Appl. No. 15/313,414, filed Nov. 22, 2016.
U.S. Appl. No. 15/314,746, filed Nov. 29, 2016.
"DeltaVTM CHARMs Commissioning," Emerson Process Management (Jan. 2013), 27 pages.
"Getting Started With Your DeltaVTM Digital Automation System," Emerson Process Management (May 2010), 202 pages.
"Gregg, J., "Experion PKS: Overview of R500," Honeywell International Inc. (Jun. 23, 2016), 65 pages."
"Improving Safety System Project Efficiencies" webinar, Honeywell International Inc. (Dec. 3, 2015), 30 pages.
"QuickCheck SNAP-ONTM Application" Product Data Sheet, Emerson Process Management (Apr. 2013), <http://www.proconexdirect.com/wp-content/uploads/2016/04/QuickCheck.pdf>, 4 pages.
Spiropoulos, E., "Agile Project Execution: The Future of Industrial Process Automation Projects," Yokogawa Electric Corporation (Oct. 26, 2015), 26 pages.

* cited by examiner

METHOD AND SYSTEM FOR COMMISSIONING PROCESS CONTROL HARDWARE

TECHNICAL FIELD

The present disclosure relates generally to process plants and process control systems, and more particularly, to smart commissioning of field devices and/or other process control devices while the devices are powered off.

BACKGROUND

Distributed process control systems, like those used in chemical, petroleum, industrial or other process plants to manufacture, refine, transform, generate, or produce physical materials or products typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process and/or environmental parameters such as temperature or pressure, etc. to control one or more processes executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system, e.g., to control at least a portion of one or more industrial processes running or executing within the plant or system. For example, the controllers and the field devices control at least a portion of a process being controlled by the process plant or system. I/O devices, which are also typically located within the plant environment, typically are disposed between a controller and one or more field devices, and enable communications there between, e.g. by converting electrical signals into digital values and vice versa. As utilized herein, field devices and controllers are generally referred to as "process control devices."

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally, the commissioning of a process plant or system involves bringing various components of the plant or system to the point where the system or plant can operate as intended. Commissioning is an involved and complex process. For example, commissioning may include actions or activities such as, inter alia, confirming an identity of an installed process control device (such as a field device) and its connections; determining and providing tags that uniquely identify the process control device within the process control system or plant; setting or configuring initial values of parameters, limits, etc.; verifying the correctness of the device's installation by manipulating signals provided to the devices; and generating as-built I/O lists to indicate the actual physical connections of the device implemented within the plant; to name a few. For some commissioning tasks, a user may utilize a commissioning tool (e.g., a handheld or portable computing device) locally at a target process control device or loop. Some commissioning tasks may be performed at an operator interface of the process control system, e.g., at an operator interface of an operator workstation included in a back-end environment of the process plant.

Typically, the commissioning of a process plant requires physical devices, connections, wiring, etc. to be installed, set up, and inter-connected in the field environment of the process plant. At the back-end environment of the plant (e.g., at the centralized administrative computing devices such as operator workstations, personal computers or computing devices, centralized databases, configuration tools, etc. that are typically placed in control rooms or other locations away from the harsher field environment of the plant), data that specifically identifies and/or addresses the various devices, their configurations, and their interconnections is integrated, verified or commissioned, and stored. As such, after the physical hardware has been installed and configured, identification information, logical instructions, and other instructions and/or data is downloaded or otherwise provided to the various devices disposed in the field environment so that the various devices are able to communicate with other devices.

Of course, in addition to commissioning actions performed in the back-end environment, commissioning actions or activities are also performed to verify the correctness of the connections and operations in the field environment of both the physical and logical devices, both individually and integrally. For example, a field device may be physically installed and individually verified, e.g., power-on, power-off, etc. A port of a field device may then be physically connected to a commissioning tool via which simulated signals may be sent to the field device, and the behavior of the field device in response to the various simulated signals may be tested. Similarly, a field device whose communication port is commissioned may eventually be physically connected to a terminal block, and actual communications between the terminal block and the field device may be tested. Typically, commissioning of field devices and/or other components in the field environment require knowledge of component identifications, and in some cases, knowledge of component interconnections so that test signals and responses can be communicated amongst field devices and other loop components and resultant behaviors verified. In currently known commissioning techniques, such identification and interconnection knowledge or data is generally provided to components in the field environment by the back-end environment. For example, the back-end environment will download field device tags that are used in control modules into the field devices that will be controlled by the control modules during live plant operations.

Eventually, after various components and portions of a process control loop have been respectively commissioned, checked, or tested, the entire loop itself is commissioned, checked, and/or tested, e.g., a "loop test." Typically, a loop test involves testing the behavior of the loop in response to various inputs or conditions, and/or in various states. An operator in the back-end environment coordinates with an operator in the field environment to inject various inputs and/or generate various conditions and/or states at the process control loop, and resultant behavior and/or measurements are examined for their level of adherence to acceptable target values and/or ranges.

SUMMARY

Techniques, systems, apparatuses, components, devices, and methods for commissioning are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

Smart commissioning of process control systems and/or plants includes various techniques, systems, apparatuses, components, and/or methods that allow for at least some portions of the commissioning process to be performed locally, automatically, and/or distributively, so that devices and/or other portions of a process plant may be partially or even entirely commissioned prior to being incorporated or integrated into the plant or system as a whole and before the devices are powered on. Smart commissioning allows, for example, various portions of process control systems to be built and at least partially commissioned at different geographical locations (e.g., at different "mod yards") prior to being brought together and integrated at the resident location or site of the process plant. In a sense, smart commissioning allows for parallel commissioning activities and actions to take place.

For example, smart commissioning allows for some (if not most) commissioning activities and/or actions to be performed independently (and indeed, in parallel, if desired) in the field environment and in the back-end environment of the process plant. Commissioning of the design and engineering implemented in the field environment no longer is dependent on the progress (and completion) of the functional design, engineering, and commissioning being performed in the back-end environment. As such, local commissioning activities of the physical components of the field environment are able to be performed independently of the commissioning of the functional or logical components of the back-end environment, and vice versa. That is, at least some portion of commissioning activities and actions in either the field environment or the back-end environment may be performed while the field environment and the back-end environment are disconnected. Moreover, at least some portion of commissioning activities and actions in the field environment may be performed before the devices in the field environment are powered on.

Consequently, as smart commissioning allows for the physical design and engineering performed in the field environment of the process plant to proceed independently of the functional design and engineering performed in the back-end environment of the process plant, commissioning scheduling dependencies between the back-end and the field are reduced, and overall calendar time that is required for commissioning the process plant is also reduced. Thus, smart commissioning optimizes the commissioning process as a whole with significant reduction in both time and personnel resources, and therefore significant reduction in costs.

One embodiment of the techniques of the present disclosure is a method for commissioning a process control device in a process plant. The method is executed on a portable computing device and includes obtaining, for each of one or more process control devices of the process plant, commissioning data for the respective process control device. At least some of the one or more process control devices are or are intended to be communicatively connected to operate in the process plant during run-time to control a process. In response to identifying an unpowered component of a process control loop in which a first process control device of the one or more process control devices is included, the method includes transferring, via a wireless link to the component, commissioning data for the first process control device while the component remains in the unpowered state, the commissioning data for use in commissioning the first process control device.

Another embodiment of these techniques is a portable computing device for use in commissioning a process control device in a process plant. The portable computing device includes one or more processors, a communication unit, and a non-transitory computer-readable memory storing executable instructions thereon. The instructions are executed by the one or more processors and cause the portable computing device to obtain, for each of one or more process control devices of a process plant, commissioning data for the respective process control device. At least some of the one or more process control devices are or are intended to be communicatively connected to operate in the process plant during run-time to control a process. In response to identifying an unpowered component of a process control loop in which a first process control device of the one or more process control devices is included, the executable instructions cause the portable computing device to transfer, via the communication unit to the component, commissioning data for the first process control device while the component remains in the unpowered state, the commissioning data for use in commissioning the first process control device.

DETAILED DESCRIPTION

Figure 1:
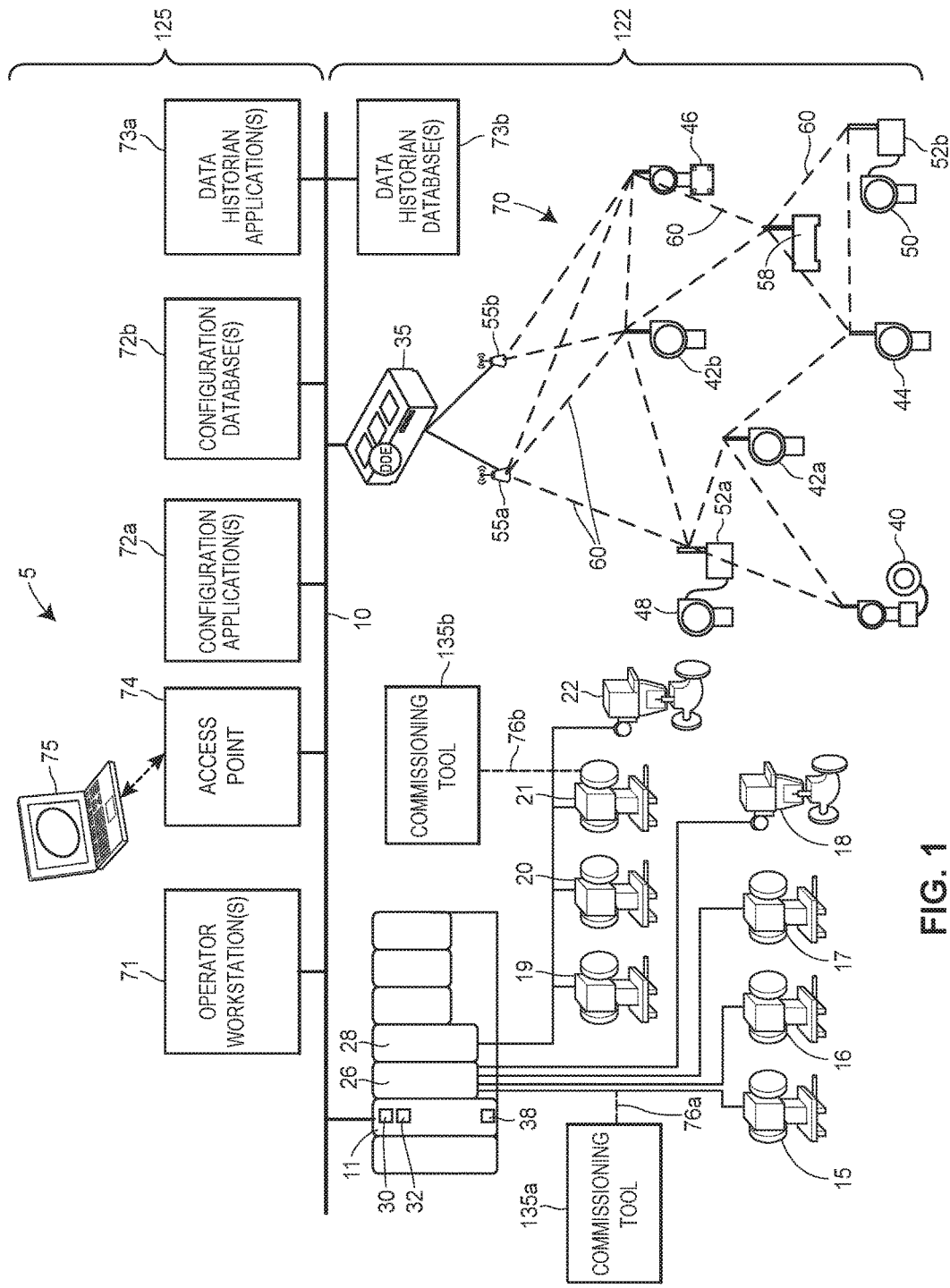
FIG. 1 depicts a block diagram illustrating an example process plant, at least a portion of which may be commissioned by utilizing the smart commissioning techniques described herein.

To commission a process plant, a portable computing device such as a commissioning tool obtains commissioning data for each of the process control devices in the process plant. Commissioning data may include a device tag for the process control device which is a unique identifier of the process control device (e.g., a model and/or serial number, such as AA-1), an Internet Protocol (IP) address for communicating with the process control device, a description of the process control device, make and model information for the process control device, a bank and/or slot for placing/locating a component within the same process control loop as the process control device, or any other suitable data for commissioning the process control device. In some embodiments, the process control device may be in an unpowered state. When the unpowered process control device is identified within the process plant, the portable computing device transfers the commissioning data to the process control device via a wireless communication link. For example, the portable computing device and the process control device may each have radio-frequency identification (RFID)/near field communication (NFC) units for transmitting/receiving an RFID/NFC signal which includes the commissioning data. The RFID/NFC signal energizes the RFID/NFC unit at the process control device so that the process control device receives the RFID/NFC signal while remaining in an unpowered state.

In other embodiments, the component within the same process control loop as the process control device is in an unpowered state. When the component is identified within the process plant, the portable computing device transfers the commissioning data for the process control device to the component via a wireless communication link. For example, the portable computing device and the component may each have RFID/NFC units for transmitting/receiving an RFID/NFC signal which includes the commissioning data for the process control device. The RFID/NFC signal energizes the RFID/NFC unit at the component so that the component receives the RFID/NFC signal while remaining in an unpowered state. In some scenarios, the component is the process control device itself.

In an exemplary scenario, a plant operator commissions the process control devices within the process plant by obtaining commissioning data for a process control device on a portable computing device. For example, the operator scans a barcode or captures an image of a label on the process control device to obtain the commissioning data. Then the operator taps the portable computing device to a component within the same process control loop as the process control device (which may be the process control device itself) to transfer the commissioning data to the component (e.g., by placing the portable computing device within a threshold communication range of the component). The operator may repeat these steps for each of the process control devices to commission the entire process plant. In some scenarios, each of the components corresponding to the process control devices may be located in the same housing (as described in more detail below). Accordingly, the operator may transfer the commissioning data for several process control devices by tapping the portable computing device to components within the same housing. In this manner, an operator does not have to travel to several areas across the process plant to commission the process control devices and can perform some if not most of the commissioning from a single location.

As discussed above, a process plant, process control system, or process control environment that, when on-line, operates to control one or more industrial processes in real-time may be commissioned utilizing one or more of the novel smart commissioning techniques, systems, apparatuses, components, devices, and/or methods described herein. The process plant, when commissioned and operating on-line, may include therein one or more wired or wireless process control devices, components, or elements that perform physical functions (such as opening or closing valves, measuring temperature, pressure, and/or other process and/or environmental parameters, and the like) in concert with a process control system to control one or more processes executing within the process plant. The process plant and/or process control system may include, for example, one or more wired communication networks and/one or more wireless communication networks. The process plant or control system may include centralized databases, such as continuous, batch, asset management, historian, and other types of databases.

To illustrate, FIG. 1 is a block diagram of an example, commissioned process plant, process control system, or process control environment 5, at least a portion of which has been commissioned by using any one or more of the smart commissioning techniques described herein. The process plant 5 includes one or more process controllers that receive signals indicative of process measurements made by field devices, process this information to implement a control routine, and generate control signals that are sent over wired or wireless process control communication links or networks to other field devices to control the operation of a process in the plant 5. Typically, at least one field device performs a physical function (e.g., opening or closing a valve, increasing or decreasing a temperature, etc.) to control the operation of a process, and some types of field devices communicate with controllers by using I/O devices. Process controllers, field devices, and I/O devices may be wired or wireless, and any number and combination of wired and wireless process controllers, field devices and I/O devices may be included in the process plant environment or system 5.

For example, FIG. 1 illustrates a process controller 11 that is communicatively connected to wired field devices 15-22 via input/output (I/O) cards 26 and 28, and that is communicatively connected to wireless field devices 40-46 via a wireless gateway 35 and a process control data highway or backbone 10 (which may include one or more wired and/or wireless communication links, and may be implemented using any desired or suitable or communication protocol such as, for example, an Ethernet protocol). In an embodiment, the controller 11 is communicatively connected to the wireless gateway 35 using one or more communications networks other than the backbone 10, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 11, which may be, by way of example, the DeltaV controller sold by Emerson Process Management, may operate to implement a batch process or a continuous process using at least some of the field devices 15-22 and 40-46. In an embodiment, in addition to being communicatively connected to the process control data highway 10, the controller 11 is also communicatively connected to at least some of the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the WirelessHART® protocol, etc. In FIG. 1, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The process controller 11 of FIG. 1 includes a processor 30 that implements or oversees one or more process control routines 38 (e.g., that are stored in a memory 32). The processor 30 is configured to communicate with the field devices 15-22 and 40-46 and with other process control devices communicatively connected to the controller 11. It should be noted that any control routines or modules described herein may have parts thereof implemented or executed by different controllers or other devices if so desired. Likewise, the control routines or modules 38 described herein which are to be implemented within the process control system 5 may take any form, including software, firmware, hardware, etc. Control routines may be implemented in any desired software format, such as using object oriented programming, ladder logic, sequential function charts, function block diagrams, or using any other software programming language or design paradigm. The control routines 38 may be stored in any desired type of memory 32, such as random access memory (RAM), or read only memory (ROM). Likewise, the control routines 38 may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, where each function block is an object or other part (e.g., a subroutine) of an overall control routine and operates in conjunction with other function blocks (via communications called links) to implement process control loops within the process control system 5. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 5. Of course, hybrid and other types of function blocks exist. Function blocks may be stored in and executed by the controller 11, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 11 may include one or more control routines 38 that may implement one or more control loops, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In FIG. 1, the field devices 15-18 are standard 4-20 mA devices or HART® devices that communicate over analog lines or combined analog and digital lines to the I/O card 26 (also referred to herein as "non-smart" or "dumb" devices), while the field devices 19-22 are smart devices, such as FOUNDATION® Fieldbus field devices, that communicate over a digital bus to the I/O card 28 using a FOUNDATION® Fieldbus communications protocol. In some embodiments, though, at least some of the wired field devices 15, 16 and 18-21 and/or at least some of the I/O cards 26, 28 additionally or alternatively communicate with the controller 11 using the process control data highway 10 and/or by using other suitable control system protocols (e.g., Profibus, DeviceNet, Foundation Fieldbus, ControlNet, Modbus, HART, etc.).

In FIG. 1, the wireless field devices 40-46 communicate via a wireless process control communication network 70 using a wireless protocol, such as the WirelessHART® protocol. Such wireless field devices 40-46 may directly communicate with one or more other devices or nodes of the wireless network 70 that are also configured to communicate wirelessly (using the wireless protocol or another wireless protocol, for example). To communicate with one or more other nodes that are not configured to communicate wirelessly, the wireless field devices 40-46 may utilize a wireless gateway 35 connected to the process control data highway 10 or to another process control communications network. The wireless gateway 35 provides access to various wireless devices 40-58 of the wireless communications network 70. In particular, the wireless gateway 35 provides communicative coupling between the wireless devices 40-58, the wired devices 11-28, and/or other nodes or devices of the process control plant 5. For example, the wireless gateway 35 may provide communicative coupling by using the process control data highway 10 and/or by using one or more other communications networks of the process plant 5.

Similar to the wired field devices 15-22, the wireless field devices 40-46 of the wireless network 70 perform physical control functions within the process plant 5, e.g., opening or closing valves, or taking measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some configurations of the process plant 5, the wireless network 70 includes non-wireless devices. For example, in FIG. 1, a field device 48 of FIG. 1 is a legacy 4-20 mA device and a field device 50 is a wired HART® device. To communicate within the network 70, the field devices 48 and 50 are connected to the wireless communications network 70 via a wireless adaptor 52a, 52b. The wireless adaptors 52a, 52b support a wireless protocol, such as WirelessHART, and may also support one or more other communication protocols such as Foundation® Fieldbus, PROFIBUS, DeviceNet, etc. Additionally, in some configurations, the wireless network 70 includes one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communications network 70. In FIG. 1, the wireless devices 40-46 and 52-58 communicate with each other and with the wireless gateway 35 over wireless links 60 of the wireless communications network 70, and/or via the process control data highway 10.

In FIG. 1, the process control system 5 includes one or more operator workstations 71 that are communicatively connected to the data highway. Via the operator workstations 71, operators may view and monitor real-time operations of the process plant 5, as well as take any diagnostic, corrective, maintenance, and/or other actions that may be required. At least some of the operator workstations 71 may be located at various, protected areas in or near the plant 5, and in some situations, at least some of the operator workstations 71 may be remotely located, but nonetheless in communicative connection with the plant 5. Operator workstations 71 may be wired or wireless computing devices.

The example process control system 5 is further illustrated as including a configuration application 72a and configuration database 72b, each of which is also communicatively connected to the data highway 10. As discussed above, various instances of the configuration application 72a may execute on one or more computing devices (not shown) to enable users to create or change process control modules and download these modules via the data highway 10 to the controllers 11, as well as enable users to create or change operator interfaces via which an operator is able to view data and change data settings within process control routines. The configuration database 72b stores the created (e.g., configured) modules and/or operator interfaces. Generally, the configuration application 72a and configuration database 72b are centralized and have a unitary logical appearance to the process control system 5, although multiple instances of the configuration application 72a may execute simultaneously within the process control system 5, and the configuration database 72b may be implemented across multiple physical data storage devices. Accordingly, the configuration application 72a, configuration database 72b, and user interfaces thereto (not shown) comprise a configuration or development system 72 for control and/or display modules. Typically, but not necessarily, the user interfaces for the configuration system 72 are different than the operator workstations 71, as the user interfaces for the configuration system 72 are utilized by configuration and development engineers irrespective of whether or not the plant 5 is operating in real-time, whereas the operator workstations 71 are utilized by operators during real-time operations of the process plant 5.

The example process control system 5 includes a data historian application 73a and data historian database 73b, each of which is also communicatively connected to the data highway 10. The data historian application 73a operates to collect some or all of the data provided across the data highway 10, and to historize or store the data in the historian database 73b for long term storage. Similar to the configuration application 72a and configuration database 72b, the data historian application 73a and historian database 73b are centralized and have a unitary logical appearance to the process control system 5, although multiple instances of a data historian application 73a may execute simultaneously within the process control system 5, and the data historian 73b may be implemented across multiple physical data storage devices.

In some configurations, the process control system 5 includes one or more other wireless access points 74 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as NFC and Bluetooth, or other wireless communication protocols. Typically, such wireless access points 74 allow handheld or other portable computing devices (e.g., user interface devices 75) to communicate over a respective wireless process control communication network that is different from the wireless network 70 and that supports a different wireless protocol than the wireless network 70. For example, a wireless or portable user interface device 75 may be a mobile workstation or diagnostic test equipment that is utilized by an operator within the process plant 5 (e.g., an instance of one of the operator workstations 71). In some scenarios, in addition to portable computing devices, one or more process control devices (e.g., controller 11, field devices 15-22, I/O devices 26, 28, or wireless devices 35, 40-58) also communicate using the wireless protocol supported by the access points 74.

The example process control system 5 may also include one or more commissioning tools 135a, 135b that are used in field environment 122 for commissioning process control devices of the process plant 5. The commissioning tool 135a, 135b may be a portable computing device, such as a laptop computer, a tablet or handheld smart device, a wearable computing device, etc. The commissioning tool 135a may be used to commission the non-smart field devices 15-18, the smart field devices 19-22, and/or other devices disposed in the field environment 122 of the process plant 5. To commission the non-smart field devices 15-18, the commissioning tool 135a may communicate over a wireless link 76a (e.g., via RFID, NFC, etc.) with the I/O card 26 or any other suitable component that is connected to the non-smart field devices 15-18. In this manner, the commissioning tool 135a may transfer commissioning data (e.g., device tags) for the non-smart field devices 15-18 to the corresponding I/O card 26 or an electronic marshaling component electrically connected to the I/O card 26 (as described in more detail below). To commission the smart field devices 19-22, the commissioning tool 135b may communicate over a wireless link 76b directly with the smart field devices 19-22. In this manner, the commissioning tool 135b may transfer commissioning data (e.g., device tags) directly to the smart field devices 19-22.

In some embodiments, the process control devices are pre-configured, e.g., while at the factory, and as such store default commissioning data before being installed or commissioned. In other embodiments, the process control devices may arrive from the factory without any commissioning data stored therein. For example, when an I/O device is communicatively connected to a non-smart field device, the I/O device does not store commissioning data for the non-smart field device until the commissioning tool 135 transfers the commissioning data to the I/O device.

It is noted that although FIG. 1 only illustrates a single controller 11 with a finite number of field devices 15-22 and 40-46, wireless gateways 35, wireless adaptors 52, access points 55, routers 58, and wireless process control communications networks 70 included in the example process plant 5, this is only an illustrative and non-limiting embodiment. Any number of controllers 11 may be included in the process control plant or system 5, and any of the controllers 11 may communicate with any number of wired or wireless devices and networks 15-22, 40-46, 35, 52, 55, 58 and 70 to control a process in the plant 5.

Further, it is noted that the process plant or control system 5 of FIG. 1 includes a field environment 122 (e.g., "the process plant floor 122") and a back-end environment 125 which are communicatively connected by the data highway 10. As shown in FIG. 1, the field environment 122 includes physical components (e.g., process control devices, networks, network elements, etc.) that are disposed, installed, and interconnected therein to operate to control the process during run-time. For example, the controller 11, the I/O cards 26, 28, the field devices 15-22, and other devices and network components 40-46, 35, 52, 55, 58 and 70 are located, disposed, or otherwise included in the field environment 122 of the process plant 5. Generally speaking, in the field environment 122 of the process plant 5, raw materials are received and processed using the physical components disposed therein to generate one or more products.

The back-end environment 125 of the process plant 5 includes various components such as computing devices, operator workstations, databases or databanks, etc. that are shielded and/or protected from the harsh conditions and materials of the field environment 122. Referring to FIG. 1, the back-end environment 125 includes, for example, the operator workstations 71, the configuration or development systems 72 for control modules and other executable modules, data historian systems 73, and/or other centralized administrative systems, computing devices, and/or functionality that support the run-time operations of the process plant 5. In some configurations, various computing devices, databases, and other components and equipment included in the back-end environment 125 of the process plant 5 may be physically located at different physical locations, some of which may be local to the process plant 5, and some of which may be remote.

Figure 2A:
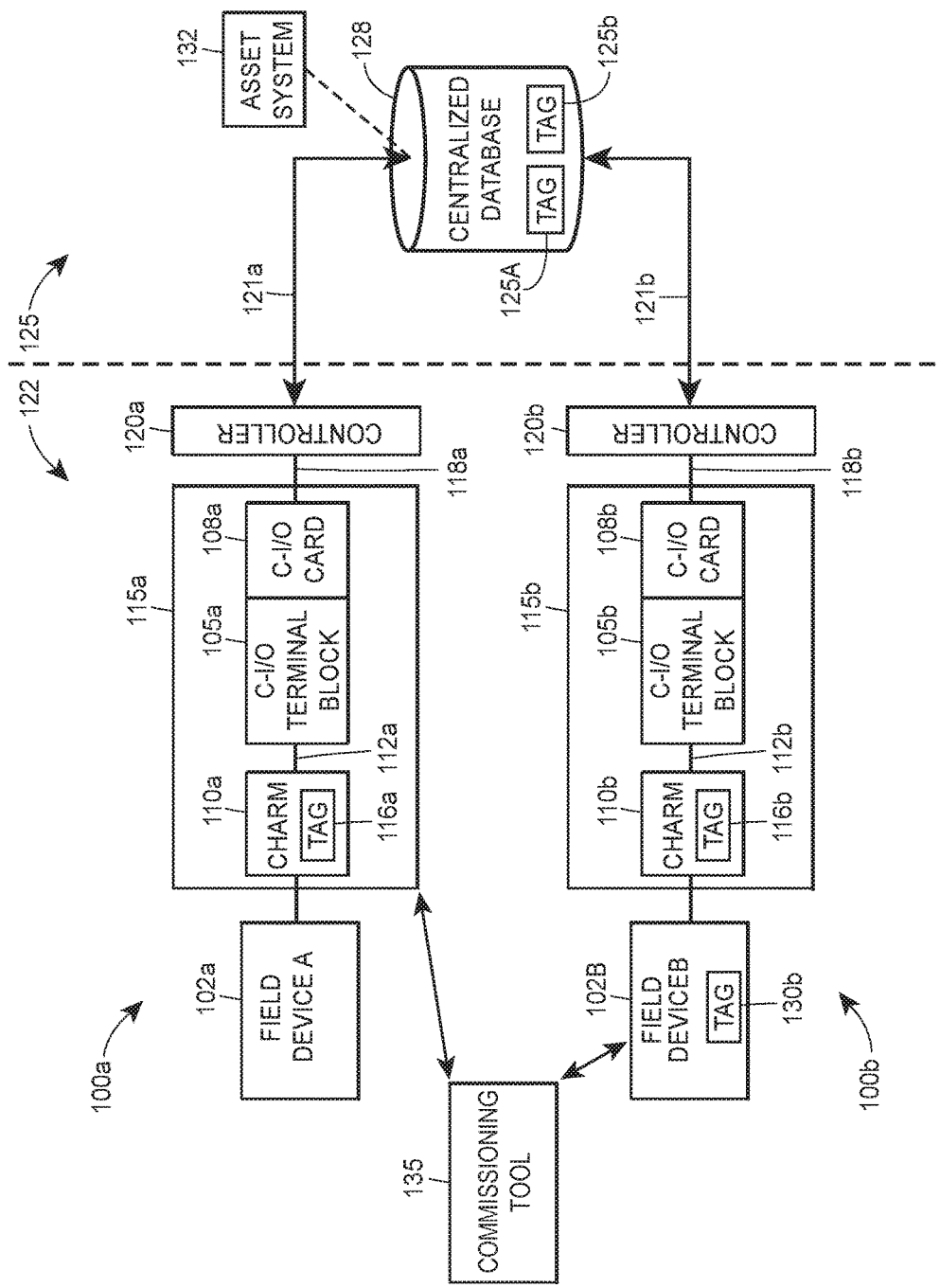
FIG. 2A includes block diagrams of two example loops which may be included in the process plant of FIG. 1 and which may be at least partially commissioned utilizing smart commissioning techniques.

FIG. 2A includes a block diagram depicting an example architecture of a process control loop 100a in which a non-smart field device 102a is included and at least portions of which may be commissioned using any one or more of the novel smart commissioning techniques described herein. Generally, as used herein, "smart" or "intelligent" field devices are field devices that integrally include one or more processors and one or more memories. On the other hand, as used herein, "dumb" or "legacy" field devices do not include on-board processor(s) and/or on-board memories.

The loop 100a may be integrated or incorporated into a process plant to be utilized in controlling a process therein during run-time operations of the process plant. For example, the loop 100a may be installed or disposed in the field environment 122 of the process plant 5.

Within the example process control loop 100a shown in FIG. 2A, the non-smart field device 102a is communicatively connected (e.g., in a wired or wireless manner) to an electronic marshaling device or component 110a (e.g., a CHARacterization Module or CHARM provided by Emerson Process Management). The electronic marshaling component 110a is communicatively connected 112a to an I/O terminal block 105a that, in turn, is communicatively connected to an I/O card 108a. The I/O-card 108a is communicatively connected 118a to a controller 120a, which, in turn, is communicatively connected 121a to the back-end environment 125 of the process plant 5. During on-line operations of the process plant 5, the process controller 120a receives digital values of the signals generated by the non-smart field device 102a and operates on the received values to control a process within the plant 5, and/or sends signals to change the operation of the non-smart field device 102a. Additionally, the controller 120a may send information to and receive information from the back-end environment 125 via the communicative connection 121a.

In FIG. 2A, the electronic marshaling component 110a, the I/O terminal block 105a, and the I/O card 108a are depicted as being located together in a cabinet or housing 115a (such as an I/O cabinet) that electrically interconnects the electronic marshaling component 110a, the I/O terminal block 105a, and the I/O card 108a and/or other components housed within the cabinet 115a via a bus, backplane, or other suitable interconnection mechanism. Of course, the housing of the CHARM 110a, the I/O terminal block 105a, and the I/O card 108a in the cabinet 115a as depicted in FIG. 2A is only one of many possible housing configurations.

Figure 2B:
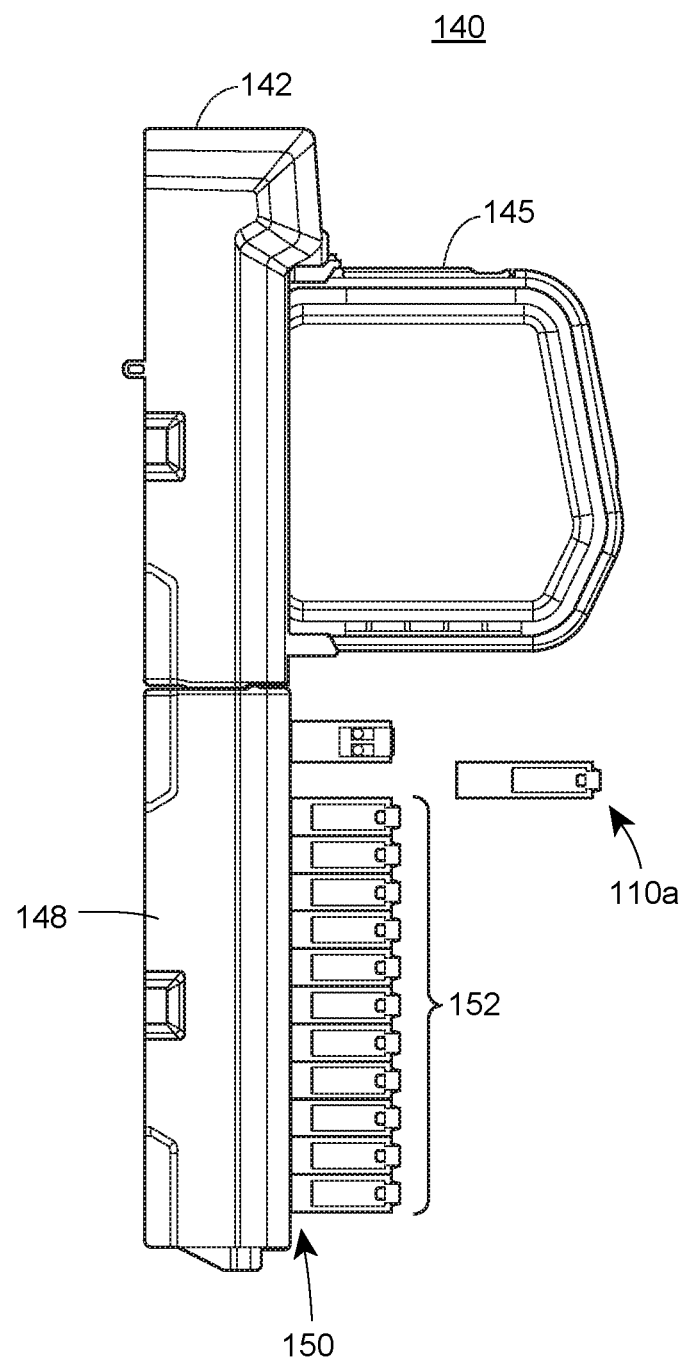
FIG. 2B illustrates an example architecture of an electronic marshaling block or apparatus which may be included in the process plant of FIG. 1.

With particular regard to the electronic marshaling component 110a, FIG. 2B illustrates a profile view of an example electronic marshaling block or apparatus 140 that supports the electronic marshaling component 110a shown in FIG. 2A, and thus is discussed below with simultaneous reference to FIG. 2A. In FIG. 2B, the electronic marshaling block or apparatus 140 includes a CHARM carrier 142 that supports one or more CHARM I/O cards (CIOCs) 145 to which the process controller 120a may be connected (e.g., via the wired or wireless connection 118a). Additionally, the electronic marshaling block or apparatus 140 includes one or more CHARM baseplates 148 that communicatively connect to the CHARM carrier 142 (and therefore, to the CHARM I/O cards 145), and that support a plurality of individually configurable channels. Each channel has a dedicated CHARM terminal block 150 into which the CHARM 110a may be securely received and electronically connected, thereby electronically marshaling the field device 102a and the I/O card 108a with the controller 120a. For instance, the I/O terminal block 105a is the CHARM terminal block 150 into which the CHARM 110a is received, and the I/O card 108a is the CIOC 145 corresponding to the CHARM terminal block 150 and to which the controller 120a is connected 118a. FIG. 2B also shows other CHARMs 152 which have been received by their respective CHARM terminal blocks 150, such as CHARM 110b, and which may be connected to other respective devices 102b in the field environment 122 of the process plant 5.

Returning now to FIG. 2A, FIG. 2A further includes a block diagram that depicts an example architecture of a process control loop 100b in which unlike the loop 100a, the loop 100b includes a smart field device 102b. At least portions of the loop 100b may be commissioned using any one or more of the novel smart commissioning techniques described herein. As shown in FIG. 2A, the smart field device 102b is communicatively connected (e.g., in a wired or a wireless manner) to an electronic marshaling device or component 110b (e.g., a CHARM). The electronic marshaling component 110 is communicatively coupled 112 to an I/O terminal block 105b that, in turn, is connected to an I/O card 108b. The I/O-card 108b is communicatively connected 118b to a controller 120b, which, in turn, is communicatively connected 121b to the back-end environment 125 of the process plant 5. During on-line operations of the process plant 5, the process controller 120b receives digital values of the signals generated by the smart field device 102b and operates on the received values to control a process within the plant 5, and/or sends signals to change the operation of the smart field device 102b. Additionally, the controller 120b may send information to and receive information from the back-end environment 125 via the communicative connection 121b.

FIG. 2A illustrates a centralized database or data store 128 that is disposed in the back-end environment 125 of the process plant 5 and that is used for commissioning purposes. The centralized database 128 stores, inter alia, data and other information that specifically identifies and/or addresses the various devices or components and their interconnections that are planned for or desired to be implemented on the process plant floor or field environment 122. Some of this commissioning data may be provided to components in the field environment 122 for use in commissioning of devices and loops therein, and some of this data may be utilized in the back-end environment 125, e.g., for the design, development, and preparation of control modules and/or operator interface modules that will operate in conjunction with the field environment 122 during live operations of the process plant 5. In an example, an approved control module is downloaded into a process controller 120 so that, when executed during live operations, the process controller 120 operates in accordance with its resident control module to send and receive various signals to/from other components in its loop 100 (and, in some cases, to/from other process controllers), thereby controlling at least a portion of the process in the process plant 5.

Thus, data that is known and utilized in the back-end environment 125 and in the field environment 122 must be synchronized and coherent. For example, a field device 102 is uniquely identified by the same, particular device tag in both the field environment 122 and the back-end environment 125 of the process plant 5. Similarly, a signal generated or received by the field device 102 is uniquely identified by the same, particular device signal tag (not shown) in both the field environment 122 and the back-end environment 125 of the process plant 5.

A device tag represents a particular instrument controller, valve, or other physical field device. A device signal tag represents a particular signal that is received or generated by a particular device and typically corresponds to a particular parameter utilized by the field device. For some devices, a device signal tag comprises a combination of a device's device tag and an identifier of a specific signal received or generated by that device, e.g., an identifier of a specific parameter referenced by a control module. For some devices, typically legacy or dumb devices, a device tag represents both the physical device and a signal generated by the device. The characters of a tag generally include alphanumeric characters, which may be interspersed with dashes or other non-alphanumeric characters.

The device tag may be a model and serial number, a bar code, an identifier in accordance with the HART, WirelessHART, HART-IP, or other industrial protocol, and the like. The particular characters of the device tag of the field device 102 may be assigned by its manufacturer, or may be assigned by a provider of the process plant 5 a priori, e.g., while generating process flow diagrams (PFDs) and/or piping and instrumentation diagrams (P&IDs), or otherwise planning out the process plant. The device tag may be provided in the back-end environment 125, for example, by asset management systems 132 such as the Asset Management Software (AMS) Suite provided by Emerson Process Management, or other inventory and installation systems.

Further, the desired or planned associations of various of components included in a process loop 100 must be synchronized and consistent between the field environment 122 and the back-end environment 125. For example, in the back-end environment 125, the database 128 stores information indicating that the field device 102 identified by the device tag is assigned to communicate via a particular I/O card 108 and/or particular I/O terminal block or channel 105, that the particular I/O card 108 is assigned to communicate with a particular controller 120, and the like. This set of associations and interconnections that are logically known at the back-end environment 125 should be physically implemented in the field environment 122. Thus, during commissioning of the process plant, not only are physical operations of various devices, components, and connections in the field environment 122 tested and verified, but the naming, associations, interconnections, and other commissioning data are also verified for consistency and coherency between the field environment 122 and the back-end environment 125.

The commissioning tool 135 may commission a process control device (e.g., non-smart field device 102a) by communicating with a component in the same process control loop as the process control device. For example, as shown in FIG. 2A, the commissioning tool 135 commissions the non-smart field device 102a in process control loop 100a by communicating with the CHARM 110a which is communicatively connected to the non-smart field device 102a while the CHARM 110a and/or the process control loop 100a are in an unpowered state. The CHARM 110a may include a communication unit such as an RFID/NFC reader for receiving an RFID/NFC signal from the commissioning tool 135. Moreover, the commissioning tool 135 may also include a communication unit for providing an RFID/NFC signal to the CHARM 110a to communicate commissioning data for commissioning the non-smart field device 102a. As mentioned above, before receiving the commissioning data, the CHARM 110a may not include any commissioning data, may include default data such as factory device data, or may include data corresponding to a different process control device.

In some scenarios, the commissioning tool 135 provides the RFID/NFC signal to the CHARM 110a while the CHARM 110a is in an unpowered state. For example, when the commissioning tool 135 is within a threshold communication range of the CHARM 110a (e.g., one inch, two inches, three inches, six inches, one foot, etc.), the commissioning tool 135 provides an NFC signal to the CHARM 110a including commissioning data, such as a device tag for the non-smart field device 102a, an IP address for communicating with the CHARM 110a and/or non-smart field device 102a, a bank and/or slot for placing/locating the CHARM 110a within the CHARM terminal block 150, a description of the non-smart field device 102a, make and model information for the non-smart field device 102a, etc. The NFC signal provides energy to an NFC reader within the CHARM 110a so that the CHARM 110a may be in an unpowered state while the NFC reader receives the NFC signal.

Then when the CHARM 110a is powered up, the NFC signal may be decoded to identify commissioning data and/or the commissioning data is stored in the memory 116a of the CHARM 110a. In some embodiments, the CHARM 110a determines its position within the CHARM terminal block 150 and compares the position to the bank and slot assigned to the CHARM 110a in the commissioning data to verify that the CHARM 110a has been placed in the proper position. Moreover, in some embodiments, the CHARM 110a transfers the commissioning data to the controller 120a and/or a centralized database 128 to synchronize the commissioning data from the field environment 122 with the commissioning data in the back-end environment 128. The centralized database 128 then stores the commissioning data from the field environment 122 in memory 125a.

While the example above refers to the CHARM 110a as the component in the process loop 110a which communicates with the commissioning tool 135 to receive commissioning data, the commissioning tool 135 may communicate with any I/O device or component within the process loop 110a functioning as a proxy for the non-smart field device 102a. For example, the commissioning tool 135 may communicate with the CHARM terminal block 150, the CHARM carrier 142, the I/O terminal block 105a, the I/O card 108, or any other suitable I/O device within the housing 115a.

In other embodiments, the component which receives and/or stores commissioning data for the process control device may be the process control device itself, as described with reference to process loop 100b. The commissioning tool 135 may commission the smart field device 102b in process loop 100b by communicating with the smart field device 102b while the smart field device 102 and/or the process control loop 100b are in an unpowered state. The smart field device 102b may include a communication unit such as an RFID/NFC reader for receiving an RFID/NFC signal from the commissioning tool 135.

In some scenarios, the commissioning tool 135 provides the RFID/NFC signal to the smart field device 102b while the smart field device 102b is in an unpowered state. For example, when the commissioning tool 135 is within a threshold communication range of the smart field device 102b (e.g., one inch, two inches, three inches, six inches, one foot, etc.), the commissioning tool 135 provides an NFC signal to the smart field device 102b including commissioning data, such as a device tag for the smart field device 102b, an IP address for communicating with the smart field device 102b, a bank and/or slot for placing/locating the CHARM 110b within the CHARM terminal block 150, a description of the smart field device 102b, make and model information for the smart field device 102b, etc. The NFC signal provides energy to an NFC reader within the smart field device 102b so that the smart field device 102b may be in an unpowered state while the NFC reader receives the NFC signal.

In other embodiments, the commissioning tool 135 provides the commissioning data for the smart field device 102b to another component in the process loop 110b, such as the CHARM 110b, the CHARM terminal block 150, the CHARM carrier 142, the I/O terminal block 105b, the I/O card 108b, or any other suitable I/O device within the housing 115b.

While the CHARMs 110a, 110b and smart field device 102b are referred to as having RFID/NFC readers (a read-only RFID/NFC unit) and the commissioning tool 135 is referred to as providing an RFID/NFC signal (a write-only RFID/NFC unit), the CHARMs 110a, 110b and/or smart field device 102b may provide an RFID/NFC signal and the commissioning tool 135 may have an RFID/NFC reader. Additionally, the CHARMs 110a, 110b, smart field device 102b, and commissioning tool 135 may each have communication units that transmit and receive RFID/NFC data, so that the CHARMs 110a, 110b, smart field device 102b, and commissioning tool 135 have RFID/NFC readers and provide RFID/NFC signals (a read/write RFID/NFC unit). Additionally, while the commissioning tool 135 and process control devices are referred to as communicating via RFID/NFC signals, the commissioning tool 134 and process control devices may communicate via any suitable short-range communication protocol, such as Bluetooth, dedicated short-range communication (DSRC), etc.

Then when the smart field device 102b is powered up, the NFC signal is decoded to identify commissioning data and/or the commissioning data is stored in the memory 130b of the smart field device 102b. In some embodiments, the smart field device 102b transfers the commissioning data to the CHARM 110b which then stores the commissioning data in the memory 116b of the CHARM. The CHARM 110b determines its position within the CHARM terminal block 150 and compares the position to the bank and slot assigned to the CHARM 110b in the commissioning data to verify that the CHARM 110b has been placed in the proper position. Moreover, in some embodiments, the CHARM 110b transfers the commissioning data to the controller 120b and/or a centralized database 128 to synchronize the commissioning data from the field environment 122 with the commissioning data in the back-end environment 128. The centralized database 128 then stores the commissioning data from the field environment 122 in memory 125b.

Figure 3:
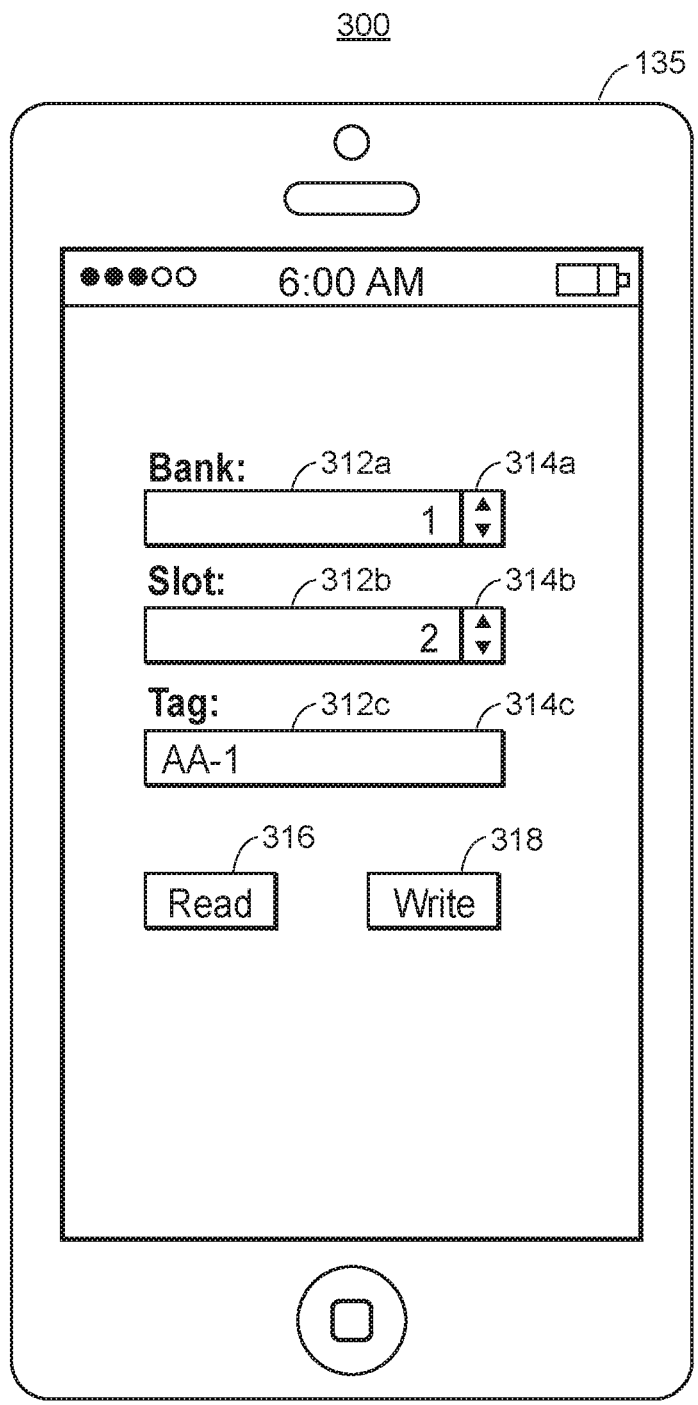
FIG. 3 illustrates an example screen display on a portable computing device depicting data for commissioning devices in the process plant.

In some embodiments, the commissioning data for each process control device in the process plant 5 (e.g., field devices, controllers, etc.) is generated and/or stored in the back-end environment 125 before being provided to the front-end system 122. For example, the configuration or development systems 72 for control modules and other executable modules, data historian systems 73, and/or other centralized administrative systems, generates device tags, IP addresses, CHARM slots, etc., for each process control device in the process plant 5. The commissioning data for each of the process control devices may be transmitted to the commissioning tool 135 via wireless access points 74, for example. Then the commissioning tool 135 displays the commissioning data for each of the process control devices in a device list. When an operator is within a threshold communication range of an unpowered component for receiving commissioning data for the process control device (e.g., the process control device itself, a proxy for the process control device, etc.), the operator selects an indication of the corresponding process control device in the device list. Commissioning data for the process control device is then transferred from the commissioning tool 135 to the component for commissioning the process control device. An example screen display 300 for presenting and/or selecting commissioning data is illustrated in FIG. 3.

The example screen display 300 may be presented on a user interface of the commissioning tool 135 and/or any other portable computing device. The screen display 300 may include commissioning data for commissioning a process control device, such as a device tag 312c (e.g., AA-1), a bank 312a (e.g., 1) and slot 312b (e.g., 2) indicating the position of a CHARM within the CHARM terminal block 150, an IP address for communicating with the process control device, a description of the process control device, make and model information for the process control device, etc. The screen display 300 may also include user controls 314a-314c for editing the commissioning data. For example, the user control 314a may be a drop-down menu for selecting a CHARM bank number, a text field for entering the CHARM bank number, etc. The user control 314b may also be a drop-down menu for selecting a CHARM slot number, a text field for entering the CHARM slot number, etc. Additionally, the user control 314c may be a text field for entering the device tag, a drop-down menu for selecting the device tag, etc. While the screen display 300 includes user controls for selecting CHARM bank and slot numbers and a device tag, this is only an illustrative and non-limiting embodiment. The screen display 300 may include user controls for presenting/editing additional or alternative commissioning data, such as an IP address for the process control device, a description of the process control device, make and model information for the process control device, etc. Any suitable types of commissioning data may be presented on the screen display 300.

The screen display 300 may also include user controls 316, 318, such as a "Read" button 316 for reading commissioning data from the component and a "Write" button 318 for writing the commissioning data to the component. For example, when an operator selects the "Write" button 318, the commissioning data 312a-312c is transferred from the commissioning tool 135 to the component via an RFID/NFC signal. In some embodiments, the operator does not need to select a user control, and the commissioning data 312a-312c is automatically transferred to the component when the commissioning tool 135 is within the threshold communication range of the component An operator may select the "Read" button 316 to receive commissioning data, such as a device tag from the component (e.g., the process control device itself, a proxy for the process control device, etc.). For example, when the "Read" button 316 is selected, the commissioning tool 135 transmits a request to the component to provide commissioning data. The request provides energy to the communication unit at the component (e.g., when the component is in an unpowered state), which may in turn provide an RFID/NFC signal to the commissioning tool 135 including the commissioning data. This process of receiving commissioning data for the component at the commissioning tool 135 is described in U.S. patent application Ser. No. 14/605,304, which is incorporated by reference herein. The commissioning tool 135 may then perform any suitable function using the commissioning data read from the component, including the functions described in U.S. patent application Ser. No. 14/605,304. This may include verifying that the process control device corresponding to the commissioning data is the process control device that was intended to be installed at a particular location and connected to other particular process control devices, determining the alignment of process control devices in the process plant 5, generating a map of the process control devices in the process plant 5, etc.

For example, after the commissioning tool 135 writes commissioning data to the component via an RFID/NFC signal, the commissioning tool 135 performs a read function to confirm that the correct commissioning data was in fact written to the component. More specifically, if the device tag for the process control device is AA-1 and the commissioning tool 135 transfers device tag AA-1 to the component, the commissioning tool 135 performs a read function to verify that the device tag stored at the component is AA-1. If the commissioning tool 135 reads another device tag, the commissioning tool 135 performs another write to the component and/or the commissioning tool 135 or the operator may take some other suitable action to resolve the issue.

In some scenarios, one commissioning tool 135a performs the "Write" function to write commissioning data to the component when the component is in an unpowered state. Then at a later time, when the component is in a powered or an unpowered state, another commissioning tool 135b performs the "Read" function to read commissioning data from the component and perform any suitable function (e.g., a verification function) using the commissioning data. In other scenarios, any suitable number of commissioning tools 135 may be used to perform "Read" and "Write" functions at any suitable points in time.

In some embodiments, the screen display 300 is presented in response to selecting a process control device from a device list display (not shown). The device list display (not shown) may include indications of each of the process control devices in the process plant 5. When the operator selects one of the process control devices, the commissioning tool 135 presents the screen display 300 to display commissioning data for the selected process control device. For example, the device list display presents a unique identifier for each process control device in the process plant, such as a device tag for the process control device, a location of the process control device within the process plant 5 or a combination thereof. When the operator approaches a component in the process plant for commissioning a corresponding process control device, the operator identifies and selects the corresponding process control device from the device list display (not shown). Then when the commissioning tool 135 is within the threshold communication range of the component or the operator selects a user control to transfer the commissioning data (e.g., the "Write" button 318), the commissioning data is transferred to the component while the component is in an unpowered state.

In other embodiments, the commissioning tool 135 includes an optical interface such as a camera or scanner. The commissioning tool 135 may scan, read, or otherwise optically obtain commissioning data from a label, a bar code, an image, a QR code (Quick Response Code), or other two-dimensional representation of the commissioning data. The commissioning tool uses image and/or optical processing techniques to automatically determine or obtain the specific characters included in the commissioning data.

For example, the commissioning tool 135 may scan a barcode on a process control device. The commissioning tool 135 then decodes the barcode to identify a device tag for the process control device, an IP address for communicating with the process control device, a CHARM slot for placing/locating the CHARM communicatively coupled to the process control device, make and model information for the process control device, etc. The received commissioning data is presented on the screen display 300 and the operator may transfer the commissioning data to the component.

In another example, a process control device may include a device serial number (device tag) displayed on the process control device. The commissioning tool 135 captures an image which includes the device serial number and analyzes the image to identify the device serial number (e.g., using optical character recognition (OCR) techniques). In some embodiments, the commissioning tool 135 then transfers the captured device serial number to the component for commissioning. In other embodiments, the commissioning tool 135 communicates with the back-end environment 125 as shown in FIG. 2A to receive additional commissioning data for the process control device having the device serial number. The back-end environment 125 then identifies the process control device in the centralized device 128 using the device tag and transmits additional commissioning data for the process control device to the commissioning tool 135. In yet other embodiments, the commissioning tool 135 automatically selects the process control device from the device list display using the captured device tag.

Figure 4:
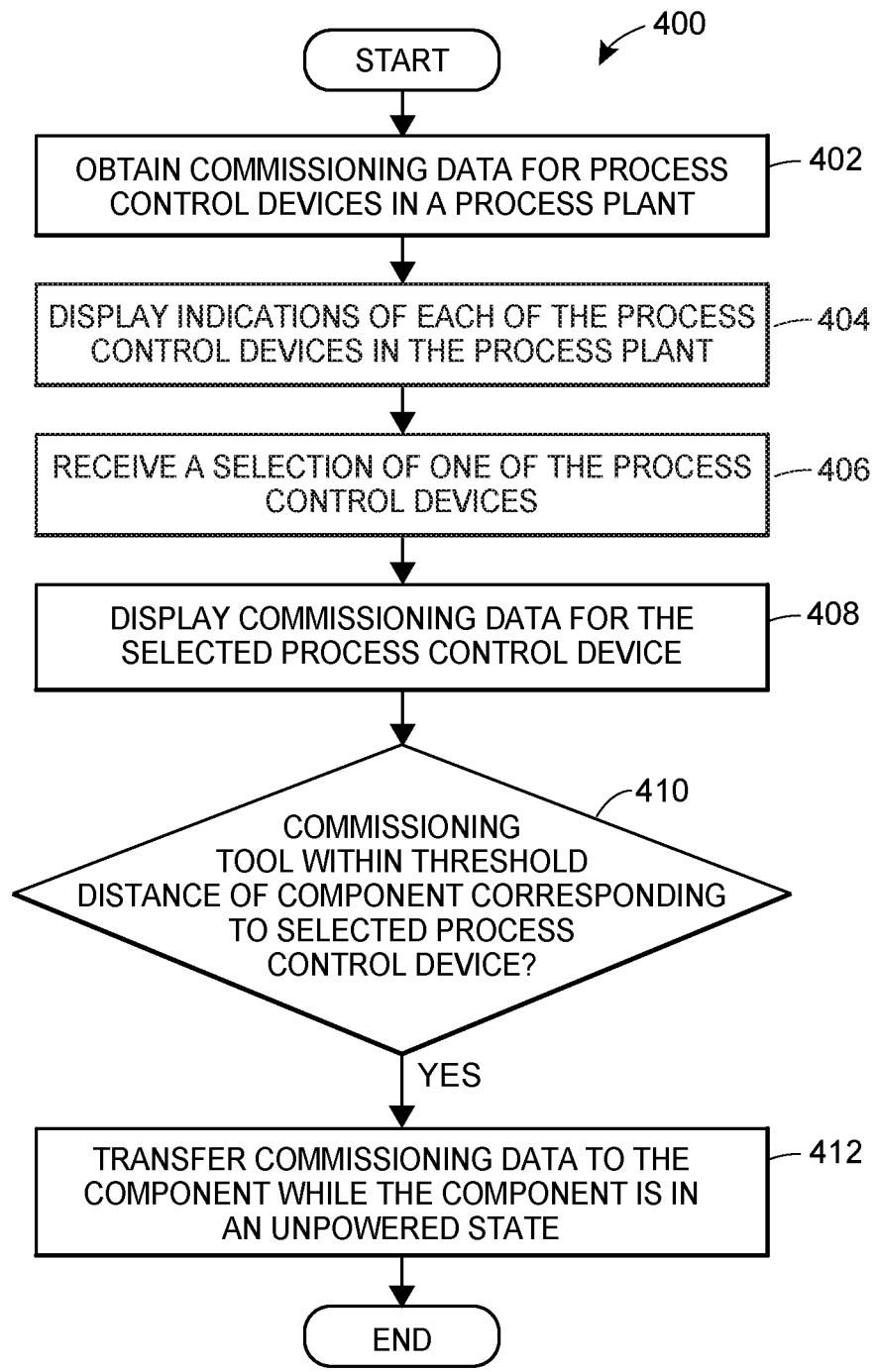
FIG. 4 is a flow diagram representing an exemplary method for commissioning a process control device in a process plant.

FIG. 4 depicts a flow diagram representing an exemplary method 400 for commissioning a process control device in a process plant. The method 400 may be executed on the commissioning tool 135 or any other portable computing device. In some embodiments, the method may be implemented in a set of instructions stored on a non-transitory computer-readable memory and executable by one or more processors of the commissioning tool 135.

At block 402, commissioning data is obtained for each of the process control devices in the process plant 5, such as field devices or controllers. The commissioning data may be obtained using the techniques as described above. For example, the configuration or development systems 72 for control modules and other executable modules, data historian systems 73, and/or other centralized administrative systems, generate device tags, IP addresses, CHARM slots, etc., for each process control device in the process plant 5. The commissioning data for each of the process control devices may be transmitted to the commissioning tool 135 via wireless access points 74. In another example, the commissioning data may be obtained by scanning, reading, or otherwise optically obtaining commissioning data from a label, a bar code, an image, a QR code, or other two-dimensional representation placed on field devices, controllers, or any other process control devices in the process plant 5.

At block 404, indications of each of the process control devices are displayed in a device list display (not shown) for example. The indications may include a unique identifier for each process control device in the process plant 5, such as a device tag for the process control device, a location of the process control device within the process plant 5, or a combination thereof.

Then at block 406, a selection of one of process control devices is received for transferring commissioning data to a component in the same process control loop as the selected process control device. An operator may select one of the process control devices presented on the device display by touch-selecting the indication of the process control device, clicking on the indication of the process control device, or in any other suitable manner. In some embodiments, a process control device is automatically selected when the commissioning tool 134 scans, reads, or otherwise optically obtains a unique identifier corresponding to the process control device. For example, the commissioning tool 134 scans a barcode displayed on a field device and decodes the barcode to identify a device serial number. Then the commissioning tool 135 automatically selects the process control device that corresponds to the device serial number.

Commissioning data is then displayed for the selected process control device (block 408) on a screen display, such as the screen display 300 as shown in FIG. 3. The commissioning data may include a device tag for the process control device, an IP address for communicating with the process control device, a description of the process control device, make and model information for the process control device, a bank and slot for a CHARM communicatively connected to the process control device, etc.

The screen display may include a user control for transferring the commissioning data to the component included in the same process control loop as the selected process control device. When the user control is selected and the commissioning tool 135 is within a threshold communication range of the component (block 410), the commissioning data is transferred to the component while the component is in an unpowered state (block 412). As mentioned above, the commissioning data may be transmitted via an RFID/NFC signal. The RFID/NFC signal energizes an RFID/NFC reader included within the component, thereby enabling the RFID/NFC reader to receive the RFID/NFC signal. In some embodiments, the commissioning data is automatically transferred to the component when the commissioning tool 135 is within a threshold communication range of the component without receiving a selection of a user control.

Embodiments of the techniques described in the present disclosure may include any number of the following aspects, either alone or combination:

1. A method of commissioning a process control device in a process plant, comprising: obtaining, at a portable computing device for each of one or more process control devices of a process plant, commissioning data for the respective process control device, wherein at least some of the one or more process control devices are communicatively connected to operate in the process plant during run-time to control a process; and in response to identifying an unpowered component of a process control loop in which a first process control device of the one or more process control devices is included, transferring, by the portable computing device via a wireless link to the component, commissioning data for the first process control device while the component remains in the unpowered state, the commissioning data for use in commissioning the first process control device.

2. The method according to aspect 1, wherein obtaining the commissioning data for each of the one or more process control devices includes obtaining commissioning data for at least one of: a field device or a controller.

3. The method according to any one of the preceding aspects, wherein obtaining the commissioning data for the respective process control device includes obtaining at least one of: a tag indicative of the respective process control device, an Internet protocol (IP) address for the respective process control device, a description of the respective process control device, or make and model information for the respective process control device.

4. The method according to any one of the preceding aspects, wherein obtaining commissioning data for the respective process control device includes: capturing, by the portable computing device, optical data at the respective process control device, the optical data including an indicator of the respective process control device.

5. The method according to any one of the preceding aspects, wherein the component of the process control loop in which the first process control device is included comprises an I/O device housed in an I/O cabinet, and obtaining the commissioning data for the first process control device comprises obtaining an indication of a bank and/or a slot for locating the I/O device within the I/O cabinet.

6. The method according to any one of the preceding aspects, wherein the I/O device verifies that the I/O device has been placed in an appropriate location within the I/O cabinet by comparing a location of the I/O device within the I/O cabinet to the bank or slot included in the commissioning data.

7. The method according to any one of the preceding aspects, wherein transferring the commissioning data to the component comprises transferring the commissioning data to a near field communication (NFC) unit at the component for storage at a memory of the component 8. The method according to any one of the preceding aspects, further comprising: receiving, at the portable computing device, the commissioning data for the first process control device from the component; and verifying, by the portable computing device, that a device tag included in the commissioning data matches a tag indicative of the first process control device.

9. The method according to any one of the preceding aspects, further comprising: automatically transferring, by the portable computing device, the commissioning data to the component upon detecting that the portable computing device is within a threshold distance of the component.

10. The method according to any one of the preceding aspects, further comprising: displaying, by the portable computing device, an indication of the each of the one or more process control devices in the process plant, wherein each indication includes the commissioning data for the respective process control device; and receiving, at the portable computing device, a selection of an indication of the first process control device; wherein transferring the commissioning data for the first process control device to the component comprises transferring the commissioning data for the first process control device to the component upon receiving the selection of the indication of the first process control device.

11. A portable computing device for commissioning a process control device in a process plant, the portable computing device including: one or more processors; a communication unit; and a non-transitory computer-readable medium coupled to the one or more processors and the communication unit and storing instructions thereon, that when executed by the one or more processors, cause the portable computing device to: obtain, for each of one or more process control devices of a process plant, commissioning data for the respective process control device, wherein at least some of the one or more process control devices are communicatively connected to operate in the process plant during run-time to control a process; and in response to identifying an unpowered component of a process control loop in which a first process control device of the one or more process control devices is included, transfer, via the communication unit to the component, commissioning data for the first process control device while the component remains in the unpowered state, the commissioning data for use in commissioning the first process control device.

12. The portable computing device according to aspect 11, wherein the one or more process control devices include at least one of: a field device or a controller.

13. The portable computing device according to either one of aspect 11 or of aspect 12, wherein commissioning data for the respective process control device includes at least one of: a tag indicative of the respective process control device, an Internet protocol (IP) address for the respective process control device, a description of the respective process control device, or make and model information for the respective process control device.

14. The portable computing device according to any one of aspects 11-13, wherein to obtain commissioning data for the respective process control device, the instructions cause the portable computing device to: capture optical data at the respective process control device, the optical data including an indicator of the respective process control device.

15. The portable computing device according to any of aspects 11-14, wherein the component of the process control loop in which the first process control device is included comprises an I/O device housed in an I/O cabinet, and the commissioning data for the first process control device includes an indication of a bank and/or a slot for locating the I/O device within the I/O cabinet.

16. The portable computing device according to any of aspects 11-15, wherein the I/O device verifies that the I/O device has been placed in an appropriate location within the I/O cabinet by comparing a location of the I/O device within the I/O cabinet to the bank or slot included in the commissioning data.

17. The portable computing device according to any of aspects 11-16, wherein the communication unit includes a near field communication (NFC) unit for transmitting the commissioning data via an NFC signal, and wherein the component includes a memory for storing the commissioning data received from the portable computing device.

18. The portable computing device according to any of aspects 11-17, wherein the commissioning data is transferred from the component to a database via a communication network when the component is in a powered state to synchronize data in a field environment of the process plant with data in a back-end environment of the process plant.

19. The portable computing device according to any of aspects 11-18, wherein the instructions further cause the portable computing device to automatically transfer the commissioning data to the first process control device upon detecting that the portable computing device is within a threshold distance of the component.

20. The portable computing device according to any of aspects 11-19, wherein the component is the first process control device.

Additionally, the previous aspects of the disclosure are exemplary only and not intended to limit the scope of the disclosure.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., an operator workstation, a commissioning tool, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of commissioning a process control device in a process plant, comprising:
    obtaining, at a portable computing device for each of one or more process control devices of a process plant, commissioning data for the respective process control device including an Internet protocol (IP) address for the respective process control device, wherein at least some of the one or more process control devices are to be communicatively connected to operate in the process plant during run-time to control a process;
    in response to identifying an unpowered component of a process control loop in which a first process control device of the one or more process control devices is included, transferring, by the portable computing device via a wireless link to the component, commissioning data for the first process control device while the component remains in the unpowered state, the commissioning data for use in commissioning the first process control device; and transferring the commissioning data for the first process control device to a database to synchronize data in a field environment of the process plant with data in a back-end environment of the process plant.

2. The method of claim 1, wherein obtaining the commissioning data for each of the one or more process control devices includes obtaining commissioning data for at least one of: a field device or a controller.

3. The method of claim 1, wherein obtaining the commissioning data for the respective process control device further includes obtaining at least one of: a tag indicative of the respective process control device, a description of the respective process control device, or make and model information for the respective process control device.

4. The method of claim 3, wherein obtaining commissioning data for the respective process control device includes:
capturing, by the portable computing device, optical data at the respective process control device, the optical data including an indicator of the respective process control device.

5. The method of claim 1, wherein the component of the process control loop in which the first process control device is included comprises an I/O device housed in an I/O cabinet, and obtaining the commissioning data for the first process control device comprises obtaining an indication of a bank and/or a slot for locating the I/O device within the I/O cabinet.

6. The method of claim 5, wherein the I/O device verifies that the I/O device has been placed in an appropriate location within the I/O cabinet by comparing a location of the I/O device within the I/O cabinet to the bank or slot included in the commissioning data.

7. The method of claim 1, wherein transferring the commissioning data to the component comprises transferring the commissioning data to a near field communication (NFC) unit at the component for storage at a memory of the component.

8. The method of claim 1, further comprising:
receiving, at the portable computing device, the commissioning data for the first process control device from the component; and
verifying, by the portable computing device, that a device tag included in the commissioning data matches a tag indicative of the first process control device.

9. The method of claim 1, further comprising:
automatically transferring, by the portable computing device, the commissioning data to the component upon detecting that the portable computing device is within a threshold distance of the component.

10. The method of claim 1, further comprising:
displaying, by the portable computing device, an indication of the each of the one or more process control devices in the process plant, wherein each indication includes the commissioning data for the respective process control device; and
receiving, at the portable computing device, a selection of an indication of the first process control device;
wherein transferring the commissioning data for the first process control device to the component comprises transferring the commissioning data for the first process control device to the component upon receiving the selection of the indication of the first process control device.

11. A portable computing device for commissioning a process control device in a process plant, the portable computing device comprising:
one or more processors;
a communication unit; and
a non-transitory computer-readable medium coupled to the one or more processors and the communication unit and storing instructions thereon, that when executed by the one or more processors, cause the portable computing device to:
obtain, for each of one or more process control devices of a process plant, commissioning data for the respective process control device including an Internet protocol (IP) address for the respective process control device, wherein at least some of the one or more process control devices are communicatively connected to operate in the process plant during run-time to control a process; and
in response to identifying an unpowered component of a process control loop in which a first process control device of the one or more process control devices is included, transfer, via the communication unit to the component, commissioning data for the first process control device while the component remains in the unpowered state, the commissioning data for use in commissioning the first process control device,
wherein the commissioning data is transferred to a database via a communication network to synchronize data in a field environment of the process plant with data in a back-end environment of the process plant.

12. The portable computing device of claim 11, wherein the one or more process control devices include at least one of: a field device or a controller.

13. The portable computing device of claim 11, wherein commissioning data for the respective process control device further includes at least one of: a tag indicative of the respective process control device, a description of the respective process control device, or make and model information for the respective process control device.

14. The portable computing device of claim 13, wherein to obtain commissioning data for the respective process control device, the instructions cause the portable computing device to:
capture optical data at the respective process control device, the optical data including an indicator of the respective process control device.

15. The portable computing device of claim 11, wherein the component of the process control loop in which the first process control device is included comprises an I/O device housed in an I/O cabinet, and the commissioning data for the first process control device includes an indication of a bank and/or a slot for locating the I/O device within the I/O cabinet.

16. The portable computing device of claim 15, wherein the I/O device verifies that the I/O device has been placed in an appropriate location within the I/O cabinet by comparing a location of the I/O device within the I/O cabinet to the bank or slot included in the commissioning data.

17. The portable computing device of claim 11, wherein the communication unit includes a near field communication (NFC) unit for transmitting the commissioning data via an NFC signal, and wherein the component includes a memory for storing the commissioning data received from the portable computing device.

18. The portable computing device of claim 11, wherein the instructions further cause the portable computing device to automatically transfer the commissioning data to the first process control device upon detecting that the portable computing device is within a threshold distance of the component.

19. The portable computing device of claim 11, wherein the component is the first process control device.

* * * * *